United States Patent
Gebler et al.

(10) Patent No.: US 6,706,087 B1
(45) Date of Patent: Mar. 16, 2004

(54) FILTER BODY OF A FLUID FILTER, ESPECIALLY AN AIR FILTER

(75) Inventors: Claude Gebler, Stuttgart (DE); Horst Schneider, Waiblingen (DE)

(73) Assignee: MAHLE Filtersysteme GmbH, Stuttgart (DE)

( * ) Notice: Subject to any disclaimer, the term of this patent is extended or adjusted under 35 U.S.C. 154(b) by 44 days.

(21) Appl. No.: 10/048,099

(22) PCT Filed: Jul. 25, 2000

(86) PCT No.: PCT/DE00/02445

§ 371 (c)(1),
(2), (4) Date: Jan. 24, 2002

(87) PCT Pub. No.: WO01/07146

PCT Pub. Date: Feb. 1, 2001

(30) Foreign Application Priority Data

Jul. 27, 1999 (DE) .......................... 199 35 297

(51) Int. Cl.[7] .......................... B01D 29/37; B01D 46/24
(52) U.S. Cl. ............... 55/492; 55/498; 55/502; 55/510; 277/918
(58) Field of Search ............... 55/492, 498, 502, 55/510; 210/450, 493.2, 497.01; 277/918

(56) References Cited

U.S. PATENT DOCUMENTS 3,481,117 A * 12/1969 McKinlay .................. 55/385.3
3,675,777 A * 7/1972 Heskett et al. .............. 210/232
4,632,682 A * 12/1986 Erdmannsdorfer ........... 55/498
5,238,717 A * 8/1993 Boylan ...................... 428/35.7
5,250,179 A * 10/1993 Spearman ................... 210/315
6,471,070 B2 * 10/2002 Janik .......................... 210/438

FOREIGN PATENT DOCUMENTS

| DE | 88 05 049 | 5/1990 |
|----|-----------|--------|
| DE | 38 38 540 | 1/1992 |
| DE | 43 18 215 | 12/1994 |
| DE | 43 22 226 | 1/1995 |
| DE | 197 18 603 | 11/1997 |
| FR | 186 929 | 9/1959 |
| GB | 1 499 922 | 2/1978 |
| WO | WO 97 41939 | 11/1997 |

* cited by examiner

Primary Examiner—Frank M. Lawrence
(74) Attorney, Agent, or Firm—Collard and Roe, P.C.

(57) ABSTRACT

A filter body of an air filter, comprising a cylindrical filter member with an end disk on at least one axial end. This end disk comprises a radially effective seal which is arranged radially in relation to the arrangement on a sealing surface when the filter body is mounted in a filter housing. This end disk also comprises a supporting section which extends, relative to the filter member, in a ring shaped manner on the axially outer side of the end disk. This supporting section is designed to be axially elastic. When the filter body is mounted in a filter housing, this supporting section is supported by a support contour formed on the filter housing and extending parallel to the end disk. In this case, the filter body can be axially positioned in the filter housing.

8 Claims, 2 Drawing Sheets

FILTER BODY OF A FLUID FILTER, ESPECIALLY AN AIR FILTER

Figure 1:
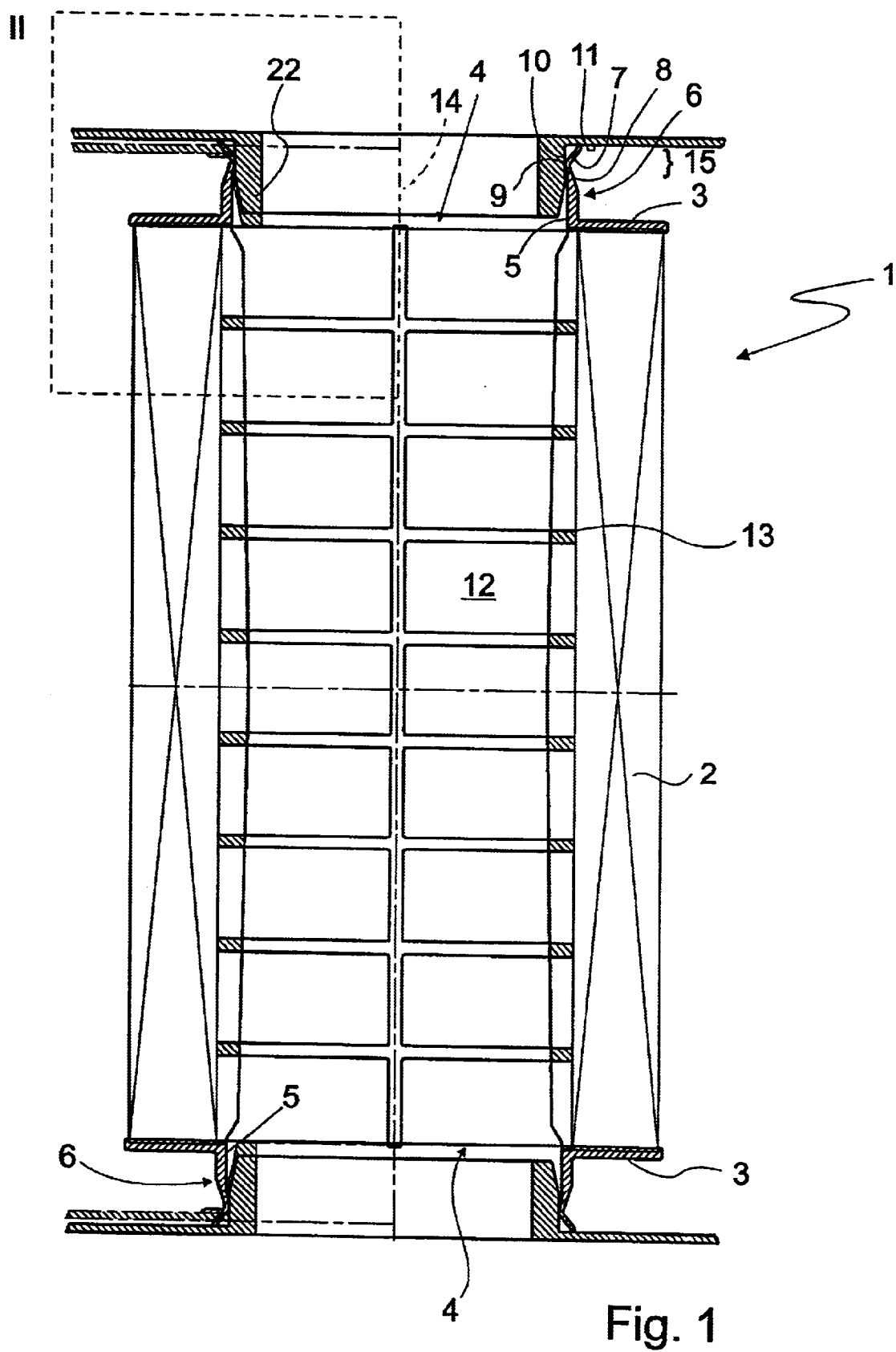

Applicants claim priority under 35 U.S.C. §119 of German Application No. 199 35 297.6 filed on Jul. 27, 1999. Applicants also claim priority under 35 U.S.C. §365 of PCT/DE00/02445, filed on Jul. 25, 2000. The international application under PCT article 22(7) was not published in English.

The invention relates to a filter body of a fluid filter, especially an air filter.

German Utility Model DE 88 05 049 U1 discloses a filter body of the type defined above, having a filter element consisting of a folded filter material in the form of a cylindrical tube. Because of these folds or pleats, such a tubular cylindrical filter element is also known as a star filter. An end disk is usually attached to both of the axial ends of this filter element, thus forming a seal with a radial action. This seal comes to rest radially against a cylindrical sealing face in the case of a filter body inserted into a filter housing. This sealing face is usually provided on a connection of the filter housing which is arranged coaxially with respect to the filter body and to which the filter body is attached or which is inserted into the filter body when at least one of the end disks is designed as an end disk that is open at the center.

Since the seals on the filter body act radially, for the filter body there is essentially the possibility of an axial adjustment within the filter housing. This axial adjustability is required, for example, to compensate for dimensional deviations due to tolerance between the filter housing and the filter body. Due to this axial adjustability, a certain relative movement between the filter body and the filter housing is possible in principle, but such movement is not desirable because it can have a negative effect on the sealing effect of the seals and because this relative movement can also lead to a problematical noise generation in operation of a vehicle equipped with these filters.

To prevent such a relative movement between the filter body and the filter housing, supporting means are mounted on the axial outside of the end disk with respect to the filter element and extend in a ring pattern there. These supporting means are designed with axial elasticity and in the case of a filter body inserted into the filter housing, they are in turn supported on a supporting contour which is designed on the filter housing and extends parallel to the end disk. Due to this support, there is an axial positioning of the filter body and the filter housing which suppresses relative movements between the filter body and the filter housing. Such supporting means may be designed in the form of a foam ring mounted on the end disk, for example.

However, it is relatively complicated and expensive to manufacture such a filter body, because in a first manufacturing step, the filter element is attached to one side of the end disk by means of a special joining technique, e.g. by plastification by means of ultrasound or by heating level softening, and in a second manufacturing step the supporting means must be attached to the other side of the end disk through a corresponding joining technique. In addition, an additional production step may be necessary to attached the seal to the end disk with a suitable joining technique. A simplification is obtained when the supporting means are already integrated into the end disk in the form of an annular collar at the time of production of the end disk, so that a joining method can be used for securing the supporting means. Since filter bodies are usually mass-produced products, eliminating a manufacturing step means a considerable economic advantage.

International Patent WO 97/41939 discloses a filter body in which the filter element is equipped with an open end disk on one axial end. On its radial inside edge, this end disk has an axial annular collar which forms a seal which acts radially. Between the annular collar and the filter element may be inserted a ring-shaped body which functions as a radial support for the annular collar.

British Patent 1,499,922 discloses a filter body whose filter element is equipped with end disks on its axial ends. Several sealing lips are molded on the end disks.

French Patent Application 1,186,929 A discloses a ring-shaped sealing element which is equipped with sealing lips that project axially. When installed, the sealing lips are deformed axially toward one another, thus producing a preliminary stress which creates the axial sealing effect.

Filter bodies of this type are relatively unstable and cannot be exposed to any especially great pressure differences.

The present invention is concerned with the problem of designing a filter body of the type defined in the preamble such that the expense required for its production are reduced.

Due to the inner frame proposed according to this invention, the stability of the filter body can be improved significantly. First, the filter element can be supported on the inner frame on the inside radially, so that the stability of the filter element with respect to radial pressure differences is increased. Secondly, the two end disks are supported axially on one another by means of the inner frame, so that forces acting axially on the filter body are transferred essentially not to the filter element but instead to the stable inner frame. Due to the increased stability, the filter body according to this invention has a longer lifetime and a broader spectrum of use.

According to an especially advantageous refinement of this invention, the annular collar which forms the supporting means as well as the end disk and the seal may all be designed in one piece as an injection-molded plastic unit, thereby also eliminating a joining operation for attaching the seal. The end disk designed in this way then need only be joined to the filter element and optionally to an inner frame to form a fully functional filter body.

In one refinement of this invention, the seal may be designed on the annular collar, thus yielding a design that is simple to manufacture. This variant can be improved upon especially expediently by having the seal and the annular collar work together in such a way that an increasing axial deformation of the annular collar causes an increasing radial adjustment of the seal in the direction of its radial sealing action. This has the result that axial distortion of the sealing body is associated with an increase in the preliminary tension on the seal and thus an improved sealing effect.

Other important features and advantages of the present invention are derived from the subordinate claims, the drawings, and the respective description of the figures with reference to the drawings.

It is self-evident that the features mentioned above and those to be discussed in detail below can be used not only in the combination given here but also in other combinations, or they may also be used alone, without going beyond the scope of the present invention.

Preferred embodiments of this invention are illustrated in the drawings and explained in greater detail in the following description.

Figure 2:
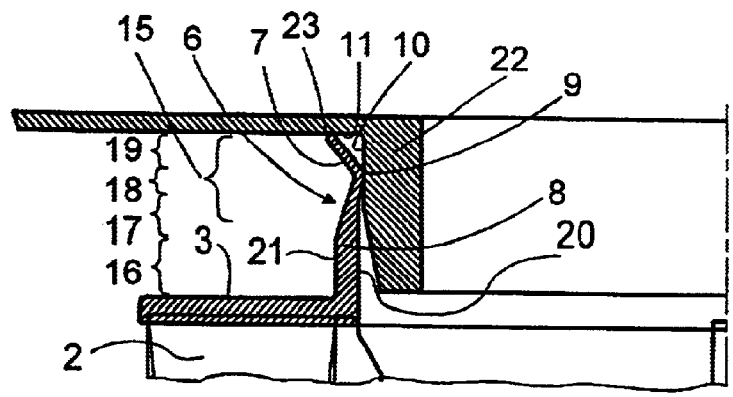
Figure 3:
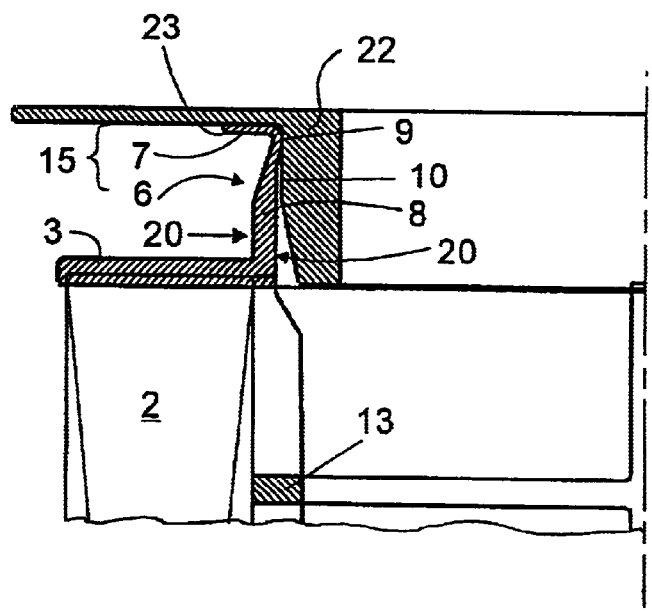
Figure 4:
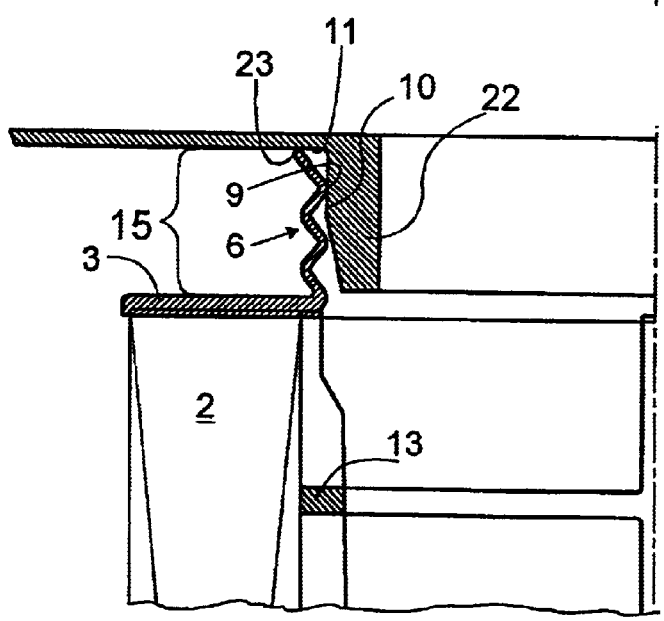

The figures show, in the form of schematic diagrams:

FIG. 1: a longitudinal section through a filter body according to this invention, FIG. 2: a detailed view of a section labeled as II in FIG. 1, showing the filter body in a first relative position with respect to a filter housing, FIG. 3: a view like that in FIG. 2, but in a different position relative to the filter housing, FIG. 4: a view like that in FIG. 2, but showing a different embodiment.

According to FIG. 1, a filter body 1 according to this invention has a filter element 2, which is formed by a tubular cylindrical, folded filter material. An end disk 3 is attached to both axial ends of the filter element 2, said end disks being designed identically in the preferred embodiment illustrated here. The The end disk 3 is attached to the filter element 2 by plastification by ultrasound, for example, or by hot level heating, where the outside of the end disk 3 which is facing filter element 2 is softened. Then the filter material can penetrate into the end disk 3, and the filter material, which is made of a nonwoven material or filter paper in particular, is permeated by the molten plastic of the end disk. After solidification of the plastic of the end disk, the result is a very strong bond of the end disk 3 to the filter element 2.

The end disks 3 are designed as open end disks 3, and to this end they each have a central opening 4. An annular collar 6 is formed on the inside edge 5 of this opening 4 on the end disk 3 and projects axially outward from the end disk 3 with respect to the filter element 2. The annular collar 6 has at least two axial sections 7 and 8, and, the axial section 8 which is arranged closer to the end disk 3 has a decreasing inside diameter with an increase in the distance from the end disk 3, while the inside diameter of the axial section 7, which is arranged a greater distance away from the end disk 3, increases with an increase in the distance from the end disk 3. The two axial sections 7 and 8 are connected to one another by a connecting section 9, which has the smallest inside diameter of the annular collar 6 and forms a ring-shaped sealing lip which acts radially toward the inside.

This sealing lip 9 serves as a radially acting seal of the end disk 3, which comes to rest on a sealing face 10 when filter body 1 is inserted into a filter housing. Sealing face 10 is designed here on a cylindrical connection 22, which forms a part of the filter housing (not otherwise shown here) and extends coaxially with the filter body 1. Although the seal (sealing lip 9) comes to rest radially on the sealing face 10, the axial section 7 of the annular collar 6 which is located farther toward the outside axially comes to rest axially on a supporting contour 11, which is designed here in the form of a ring disk and extends parallel to the end disk 3.

An inner frame 13 provided in the interior 12 of the filter element 2 serves to provide radial support for the filter element 2. The inner frame 13 here is also attached to the end disk 3 and serves at the same time to provide axial support for the end disks 3.

As shown in FIGS. 1 through 4, the end disk 3, annular collar 6 and seal 9 form a single unit which is preferably made of plastic in one piece by injection molding. The plastic used for this should have enough stiffness to provide reinforcement for filter element 2, and on the other hand it should have elastic properties which permit a sealing effect on the one hand while also permitting a spring action on the other hand. Due to the elastic properties of the plastic used to form the annular collar 6, a type of joint is formed in the area of the ring-shaped connecting zone 9, permitting swiveling adjustments of the axial section 7 which is connected to this on the outside axially and by means of which the angle of inclination of this axial section 7 can be varied in the profile with respect to the longitudinal axis 14 of the filter body 1. However, due to the reversibility of the material, these adjusting movements are elastic, so that an axial end section 15 which faces away from the end disk 3 and is represented by a curly bracket in FIG. 1 is designed with axial elasticity.

When the filter body 1 is inserted into the respective filter housing, this axial end section 15 or section 7, which is on the outside axially, is supported on the supporting contour 11, so that the filter body 1 is positioned axially in the filter housing. In this embodiment, both of the end disks 3 are equipped with these supporting means 6, 15, so this yields an axial centering effect for the filter body 1. The supporting means 6, 15 prevent movement of the filter body 1 relative to the filter housing, so that wear phenomena and noise are reduced.

Due to the radially acting seal 9 on both end disks 3, the filter body 1 is mounted so that it is axially movable on the connection 22. Due to the positioning or centering of filter body 1, which is achieved with the help of the supporting means 6, 15, an optimum relative position between the filter body 1 and the housing is always guaranteed.

The functioning of the supporting means (annular collar 6 and axial section 15) is illustrated in FIGS. 2 and 3.

According to FIGS. 2 and 3, the filter body 1 according to this invention is fully functional in a relatively large tolerance range with regard to the axial extent of the filter body 1 on the one hand and the axial distance of the supporting contours 11, which are opposite one another in the housing, on the other hand. In FIG. 2 the opposing supporting contours 11 are a relatively great distance apart, so there is little or no axial deformation of the elastic section 15. In contrast with that, the opposing supporting contours 11 in FIG. 3 are a relatively small distance apart, with the result that the elastic area 15 undergoes relatively great elastic deformation axially.

The profiling of the annular collar 6, which forms the seal 9 and the supporting means and has four axial ring sections on the end disk 3, beginning with an increasing distance from the end disk 3, namely a first ring section 16, a second ring section 17, a third ring section 18 and a fourth ring section 19, each being characterized by a curly bracket, should also be pointed out here. In the first ring section 16, an inside diameter 20 and an outside diameter 21 are constant, so the thickness of the material of the annular collar 6 is constant in this first ring section 16. In the second ring section 17, the inside diameter 20 remains constant while the outside diameter 21 decreases continuously with an increase in the distance from the end disk 17, so the thickness of the material is reduced here. In the third ring section 18, the inside diameter 20 as well as the outside diameter 21 are reduced to the same extent, so the thickness of the material remains essentially constant in this section 18. In the fourth section 19, both the inside diameter 20 as well as the outside diameter 21 increase again uniformly with an increase in the distance from the end disk 3, so that here again, the thickness of the material remains essentially constant. Consequently, the smallest inside diameter 20 occurs in the connecting section 9 which forms the sealing lip, so that this yields a linear seal.

If the distance between the supporting contour 11 and the end disk 3 facing it is reduced from the transition of the relative position according to FIG. 2 to the relative position according to FIG. 3, for example, then in the elastically deformable axial section 15, an end 23 which is in contact with the supporting contour 11 is adjusted radially outward, thus producing a restoring force which acts radially inward in the elastically deformable section 15. This restoring force, which acts inward radially, supports the seal 9 which acts inward radially, so the sealing effect of this seal 9 is improved. In addition, the seal 9 and the axial section 7 which is in contact with the supporting contour 11 are both made of the same plastic, because the seal 9 is integrally molded on the annular collar 6, so that an axial seal is also achieved additionally on the supporting contour 11 and increases with an increase in the axial distortion of the filter body 1 in the housing.

In the embodiment illustrated in FIGS. 1–3, the annular collar 6 has only one axial section having an approximately V-shaped profile in the longitudinal center section, with a section 8 inclined toward the sealing face and a section 7 inclined away from the sealing face 10, but in the embodiment according to FIG. 4, several such V-shaped sections are aligned in a row axially, thus yielding on the whole a corrugated or zigzag-shaped profile for the annular collar 6 in the longitudinal center section. The axially flexible section 15 thus extends over the entire axial length of the annular collar 6. An especially suitable spring characteristic can be achieved due to the annular collar 6, which is thus designed in the manner of folded bellows. In addition, with appropriate dimensioning of this profile and the sealing face, several ring-shaped peaks or edges which are located on the inside radially come to rest on the sealing face 10, thus forming a seal, so that several seals which act radially are connected, in series, and thus the sealing effect can be increased.

Again in these embodiments, a reduction in the distance between the supporting contour 11 and the respective end disk 3 causes an increase in the preliminary tension on the sealing lip(s) which is/are designed on the inside radially, thus increasing the sealing effect accordingly.

In the case of the filter body 1 according to this invention, a thermoplastic elastomer based on polyester (TEEE) is preferably used to produce the one-piece injection-molded unit comprised of end disk 3 and annular collar 6. Such a plastic is available commercially under the brand name Hytrel®. Hytrel is stable up to at least 90° C., and in particular it has reversible elasticity, so that air filters and hydraulic filters can be produced with end disks 3 made of this, plastic and equipped with seal 9 in one piece. It is clear that the filter body 1 according to this invention can also be used as a fuel filer or an oil filter or the like, in particular when a plastic that is stable at the temperatures occurring under such conditions is used to produce the unit consisting of the end disk 3, annular collar 6 and seal 9.

What is claimed is:

1. A filter body of an air filter for coupling to a connection element having a supporting contour, the filter body comprising:
   a) a cylindrical filter element made of filter material;
   b) an inner frame disposed within said filter element for supporting said filter element radially; and
   c) at least one end unit coupled to at least one end of said filter material and said inner frame comprising:
      i) an end disk mounted on at least one axial end of said filter element; and
      ii) a ring shaped axially extending collar coupled to said end disk, wherein said axially extending collar has an axially elastic section which includes a tapered section that decreases in thickness as it extends axially away from said end plate, a coupling section coupled to said tapered section forming a seal when it engages the connection element and at least one constant section coupled to said coupling section and having a substantially constant thickness, wherein said tapered section extends radially inward towards said coupling section while said constant section extends radially out from said coupling section.

2. A filter body of an air filter for coupling to a connection element having a supporting contour, the filter body comprising:
   a) a cylindrical filter element made of filter material;
   b) an end unit formed from TEEE comprising:
      i) an end disk mounted on at least one axial end of said filter element;
      ii) an axially extending collar coupled to said end disk extending in a ring shape, on an axial outside end of said end disk with respect to said filter element wherein said axially extending collar has axial elasticity and includes a seal extending radially inward from said axially extending collar forming a ring shaped sealing lip;
   c) an inner frame which supports said filter element radially and supports said end disks axially.

3. A filter body of an air filter for coupling to a connection element having a supporting contour, the filter body comprising:
   a) a cylindrical filter element made of filter material;
   b) at least one end unit comprising:
      i) an end disk mounted on at least one axial end of said filter element;
      ii) an axially extending annular collar coupled to said end disk extending in a ring shape, on an axial outside end of said end disk with respect to said filter element wherein said axially extending collar has axial elasticity and includes the following components:
         a) a seal extending radially inward from said axially extending collar forming a ring shaped sealing lip;
         b) at least one first axial section having a substantially constant thickness coupled to said seal;
         c) at least one second axial section coupled to said seal wherein said second axial section has a decreasing thickness extending axially away from said end disk and wherein the filter body is adapted to receive the connection element so that the supporting contour extends parallel to said end disk and is inserted into a filter housing so that the filter body is positioned axially in said filter housing, and wherein said first axial section is formed as an axially elastic section and is supported axially on said supporting contour, and wherein said annular collar and said and disk are made in one piece from an injection molded plastic; and
      d) an inner frame disposed within said filter element for supporting said filter element radially, and supporting said end disks axially.

4. The filter body according to claim 3, wherein said seal (9) is formed on said the annular collar.

5. The filter body according to claim 4, wherein said seal and said annular collar work together so that an increasing axial deformation of said annular collar causes an increasing radial adjustment of said seal in the direction of its radial sealing effect.

6. The filter body according to claim 3, wherein said annular collar has a corrugated profile in a central longitudinal section.

7. The filter body assembly according to claim 3, wherein a sealing face is formed by a cylindrical outer jacket of a connection which extends coaxially with the filter body inside the filter housing, and wherein said end disk has a central opening (4) having an inside edge wherein said the annular collar is disposed on said inside edge of said central opening is.

8. The filter body according to claim 3, wherein said filter element has two axial ends that are each equipped with one of said end disks so that the filter body, inserted into the filter housing, is centered axially in the filter housing.

* * * * *